(12) United States Patent
Myers et al.

(10) Patent No.: US 11,829,742 B2
(45) Date of Patent: Nov. 28, 2023

(54) CONTAINER-BASED SERVER ENVIRONMENTS

(71) Applicant: MicroStrategy Incorporated, Vienna, VA (US)

(72) Inventors: Clayton Myers, Oak Hill, VA (US); Brett E. Morris, Arlington, VA (US); Andrew Scott Mears, Leesburg, VA (US); Shreyas Shah, Vienna, VA (US); Martin Lucius Bonica, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 469 days.

(21) Appl. No.: 16/541,763

(22) Filed: Aug. 15, 2019

(65) Prior Publication Data
US 2021/0048998 A1 Feb. 18, 2021

(51) Int. Cl.
*G06F 9/44* (2018.01)
*G06F 8/65* (2018.01)
(Continued)

(52) U.S. Cl.
CPC ............ *G06F 8/65* (2013.01); *G06F 9/45558* (2013.01); *G06F 16/903* (2019.01);
(Continued)

(58) Field of Classification Search
None
See application file for complete search history.

(56) References Cited

U.S. PATENT DOCUMENTS 7,457,248 B1 * 11/2008 Ali ...................... H04L 43/0811
370/235
8,238,913 B1 * 8/2012 Bhattacharyya ...... H04L 67/142
455/436
(Continued)

FOREIGN PATENT DOCUMENTS

WO WO 2018197928 11/2018

OTHER PUBLICATIONS

Vindeep Singh et al., "Container-based microservice architecture for cloud applications", 2017 (Year: 2017).*

(Continued)

*Primary Examiner* — Wei Y Zhen
*Assistant Examiner* — Lanny N Ung
(74) *Attorney, Agent, or Firm* — Fish & Richardson P.C.

(57) ABSTRACT

Methods, systems, and apparatus, including computer programs encoded on computer-storage media, for container-based server environments. In some implementations, a server environment is provided using a plurality of containers that provide instances of different software modules. The plurality of containers includes a first container running a first software image of a particular software module. Various operations can be performed in response to determining that an updated software image is available for the particular software module. For example, execution is started for a second container that provides an instance of the updated software image. Incoming requests are to the second container while continuing to process, using the first container, one or more requests that were received before starting execution of the second container. In response to determining that a level of activity of the first container is below a threshold, the execution of the first container is stopped.

20 Claims, 5 Drawing Sheets

(51) Int. Cl.
*G06F 9/455* (2018.01)
*G06F 16/904* (2019.01)
*G06F 16/903* (2019.01)

(52) U.S. Cl.
CPC .. *G06F 16/904* (2019.01); *G06F 2009/45575* (2013.01); *G06F 2009/45595* (2013.01)

(56) References Cited

U.S. PATENT DOCUMENTS

| | | | |
|---|---|---|---|
| 8,762,945 | B2 | 6/2014 | Arnold et al. |
| 8,887,132 | B1 | 11/2014 | Hunter |
| 9,122,562 | B1 | 9/2015 | Stickle |
| 9,367,305 | B1 | 6/2016 | Kumar et al. |
| 9,767,312 | B2 | 9/2017 | Sahoo et al. |
| 9,928,210 | B1 | 3/2018 | Zhang et al. |
| 9,959,104 | B2 | 5/2018 | Chen et al. |
| 9,965,261 | B2 | 5/2018 | Chen et al. |
| 10,002,247 | B2 | 6/2018 | Suarez et al. |
| 10,007,509 | B1* | 6/2018 | Qureshi .................... G06F 8/65 |
| 10,101,985 | B1 | 10/2018 | Prakash et al. |
| 10,169,023 | B2 | 1/2019 | Ciano et al. |
| 10,191,778 | B1 | 1/2019 | Yang et al. |
| 10,241,778 | B2 | 3/2019 | Emeis et al. |
| 10,244,034 | B2 | 3/2019 | Joshi et al. |
| 10,261,782 | B2 | 4/2019 | Suarez et al. |
| 10,310,949 | B1 | 6/2019 | Chakraborty et al. |
| 10,356,214 | B2 | 7/2019 | Joshi et al. |
| 10,380,081 | B2 | 8/2019 | Brady et al. |
| 10,389,582 | B1 | 8/2019 | Fakhouri et al. |
| 11,023,270 | B2 | 6/2021 | Mahajan et al. |
| 11,062,022 | B1 | 7/2021 | Kalamkar et al. |
| 11,106,455 | B2 | 8/2021 | Myers et al. |
| 11,134,098 | B1 | 9/2021 | Lieberman et al. |
| 11,182,193 | B2 | 11/2021 | Skourtis et al. |
| 11,288,053 | B2 | 3/2022 | Myers et al. |
| 11,412,040 | B1 | 8/2022 | Shah et al. |
| 2005/0060722 | A1* | 3/2005 | Rochette .................... G06F 8/60 719/319 |
| 2008/0216056 | A1* | 9/2008 | Bate .......................... G06F 8/71 717/127 |
| 2011/0289503 | A1* | 11/2011 | Toub ...................... G06F 9/4843 718/102 |
| 2016/0162277 | A1* | 6/2016 | Fenzl ........................ G06F 8/62 717/170 |
| 2017/0093923 | A1* | 3/2017 | Duan .................. G06F 11/2028 |
| 2017/0147319 | A1 | 5/2017 | Riek et al. |
| 2017/0154017 | A1 | 6/2017 | Kristiansson et al. |
| 2017/0177860 | A1 | 6/2017 | Suarez et al. |
| 2017/0177877 | A1 | 6/2017 | Suarez et al. |
| 2017/0185488 | A1 | 6/2017 | Kumarasamy et al. |
| 2017/0300311 | A1 | 10/2017 | Lopez et al. |
| 2017/0315795 | A1 | 11/2017 | Keller |
| 2018/0074855 | A1* | 3/2018 | Kambatla ................ G06F 9/505 |
| 2018/0075086 | A1 | 3/2018 | Yam et al. |
| 2018/0088926 | A1 | 3/2018 | Abrams |
| 2018/0088935 | A1 | 3/2018 | Church et al. |
| 2018/0095778 | A1 | 4/2018 | Aydelott et al. |
| 2018/0095973 | A1 | 4/2018 | Huang et al. |
| 2018/0136931 | A1 | 5/2018 | Hendrich et al. |
| 2018/0157516 | A1 | 6/2018 | Kristiansson et al. |
| 2018/0173502 | A1 | 6/2018 | Biskup et al. |
| 2018/0205652 | A1 | 7/2018 | Saxena |
| 2018/0285199 | A1 | 10/2018 | Mitkar et al. |
| 2018/0285210 | A1 | 10/2018 | Mitkar et al. |
| 2018/0341471 | A1 | 11/2018 | Stefanov et al. |
| 2019/0034313 | A1 | 1/2019 | Vedurumudi et al. |
| 2019/0050680 | A1 | 2/2019 | Waugh et al. |
| 2019/0095254 | A1 | 3/2019 | Rao |
| 2019/0123956 | A1 | 4/2019 | Satapathy et al. |
| 2019/0132329 | A1 | 5/2019 | Verberkt et al. |
| 2019/0163559 | A1 | 5/2019 | Takahashi et al. |
| 2019/0208031 | A1 | 7/2019 | Bennet et al. |
| 2019/0230130 | A1 | 7/2019 | Beckman et al. |
| 2019/0235897 | A1* | 8/2019 | Goel .................... G06F 9/45545 |
| 2019/0260716 | A1 | 8/2019 | Lerner |
| 2019/0278669 | A1 | 9/2019 | Mueller-Wicke et al. |
| 2019/0303541 | A1 | 10/2019 | Reddy et al. |
| 2019/0354389 | A1 | 11/2019 | Du et al. |
| 2019/0392045 | A1 | 12/2019 | De Lima Junior et al. |
| 2020/0067763 | A1 | 2/2020 | Vytla |
| 2020/0356806 | A1 | 11/2020 | Li et al. |
| 2020/0394120 | A1 | 12/2020 | Salmi et al. |
| 2021/0042141 | A1 | 2/2021 | De Marco et al. |
| 2021/0048995 | A1 | 2/2021 | Myers et al. |
| 2021/0049002 | A1 | 2/2021 | Myers et al. |
| 2021/0240734 | A1 | 8/2021 | Shah et al. |
| 2021/0382846 | A1 | 12/2021 | Miller et al. |
| 2022/0004381 | A1 | 1/2022 | Myers et al. |
| 2022/0147378 | A1 | 5/2022 | Tarasov et al. |
| 2022/0215111 | A1 | 7/2022 | Ekins |
| 2022/0222070 | A1 | 7/2022 | Kunjuramanpillai et al. |
| 2022/0229649 | A1 | 7/2022 | Myers et al. |

OTHER PUBLICATIONS

Rajkumar Buyya et al., "Cost-Efficient Orchestration of Containers in Clouds: A Vision, Architectural Elements, and Future Directions", Jul. 2018 (Year: 2018).*

Ma et al., "Efficient service handoff across edge servers via docker container migration author:," 2017, SEC '17: Proceedings of the Second ACM/IEEE Symposium on Edge Computing, 11:1-13.

Singh et al., "Container-based microservice architecture for cloud applications," May 2017, 2017 International Conference on Computing, Communication and Automation (ICCCA), 847-52.

Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>.

docs.docker.com [online], "Get Started, Part 1: Orientation and setup," 2017, retrieved on Oct. 25, 2019, retrieved from URL<https://docs.docker.com/get-started/>, 6 pages.

Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.

Edureka.co [online], "Docker tutorial—Introduction to docker & containerization," 2017, retrieved on Oct. 25, 2019, retrieved from URL <https://www.edureka.co/blog/docker-tutorial>, 10 pages.

Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.

Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.

Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.

linuxize.com [online], "How to Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.

MicroStrategy.com [online], "Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.

Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.

Tuton, "Deploy a MongoDB replica set using the IBM Cloud Kubernetes Service," IBM Developer, Mar. 15, 2018, 14 pages.

(56) References Cited

OTHER PUBLICATIONS

Wikipedia.org [online], "Docker(software)," Mar. 2013, retrieved on Oct. 25, 2019, retrieved from URL <https://en.wikipedia.org/wiki/Docker_(software)>, 8 pages.

Wikipedia.org [online], "OS-level virtualization," Aug. 2006, retrieved on Oct. 25, 2019, retrieved from URL <https://en.wikipedia.org/wiki/OS-level_virtualization>, 4 pages.

Wikipedia.org [online], "System Image," Feb. 2013, retrieved Oct. 25, 2019, retrieved from URL <https://en.wikipedia.org/wiki/System_image>, 2 pages.

www2.microstrategy.com [online], "MicroStrategy Intelligence Server," Apr. 2019, retrieved on Oct. 25, 2019, retrieved from URL <https://www2.microstrategy.com/producthelp/10.4/ProjectDesignGuide/WebHelp/Lang_1033/Content/ProjectDesign/MicroStrategy_Intelligence_Server.htm>.

Xu et al.; "Mining Container Image Repositories for Software Configuration and Beyond"; 2018 ACM/IEEE 40th International Conference on Software Engineering: New Ideas and Emerging Results—ICSE-NIER'18, May 27-Jun. 3, 2018, 6 pages.

Tao et al., "Dynamic Resource Allocation Algorithm for Contamer-based Service Computing"; 2017 IEEE 13th International Symposium on Autonomous Decentralized Systems—2017 IEEE, 62-7.

U.S. Office Action in U.S. Appl. No. 16/542,023, dated Mar. 12, 2021, 15 pages.

U.S. Notice of Allowance in U.S. Appl. No. 16/542,058, dated Apr. 12, 2021, 10 pages.

U.S. Office Action in U.S. Appl. No. 16/542,058, dated Nov. 23, 2020, 18 pages.

www.en.wikipedia.org [online], "Online Analytical Processing" Mar. 2018, retrieved on Mar. 19, 2020, retrieved from URL <https://en.wikipedia.org/wiki/Online_analytical_processing>. 14 pages.

U.S. Office Action in U.S. Appl. No. 16/542,023, dated Aug. 20, 2021, 14 pages.

U.S. Office Action in U.S. Appl. No. 16/542,023, dated Dec. 2, 2021, 6 pages.

Wong, "What's the Difference Between Containers and Virtual Machines?," Jul. 15, 2016, Electronic Design, retrieved from URL <http://electronicdesign.com/dev-tools/what-s-difference-between-containers-and-virtualmachines>, 3 pages.

U.S. Office Action in U.S. Appl. No. 16/780,868, dated Feb. 3, 2022, 13 pages.

Brown et al., "A Model of Configuration Complexity and its Application to a Change Management System," 2005 9th IFIP/1EEE International Symposium on Integrated Network Management, 2005, IM 2005, 2005, 631-644.

Office Action in U.S. Appl. No. 16/780,868, dated Jul. 21, 2022, 12 pages.

Notice of Allowance in U.S. Appl. No. 17/377,994, dated Sep. 28, 2022, 12 pages.

Office Action in U.S. Appl. No. 17/665,119, dated Oct. 21, 2022, 13 pages.

Office Action in U.S. Appl. No. 16/780,868, dated May 30, 2023, 17 pages.

Office Action in U.S. Appl. No. 17/665,119, dated Apr. 14, 2023, 20 pages.

Merkel, "Docker: lightweight linux containers for consistent development and deployment," Linux Journal, Mar. 2014, 2014(239), 5 pages.

Office Action in U.S. Appl. No. 18/102,433, dated Jul. 19, 2023, 19 pages.

Tarasov et al., "In search of the ideal storage configuration for Docker containers," Proceedings of 2017 IEEE 2nd International Workshops on Foundations and Applications of Self* Systems (FAS*W), Sep. 18-22, 2017, Tucson, AZ, USA, 199-206, 8 pages.

* cited by examiner

CONTAINER-BASED SERVER ENVIRONMENTS

TECHNICAL FIELD

The present specification relates to container-based server environments.

BACKGROUND

Traditionally, separate servers such as a database server, a document library server, a web server, and a collaboration server are used collectively to provide server functions.

SUMMARY

In some implementations, a computing system provides a server environment by running multiple software modules as containers that communicate with each other to respond to provide services to clients. For example, software modules for different functions, applications, and/or services within the server environment may be executed as different containers, which can operate separately and independently of each other. One or more of the containers may provide front-end interfaces for client devices to interact with the server environment. One or more of the containers may provide back-end functions such as query processing, natural language processing, access control, authentication, database processing, and so on. The containers in the cluster may be able to communicate with certain other containers within the cluster to fulfill user requests. For example, the arrangement may limit which containers may communicate with each other, as well as the nature of the communications, for example, using application programming interfaces (APIs) to specify the types of interactions permitted.

A container-based server environment can provide various advantages in managing and upgrading the server environment. For example, containers can be dynamically started and stopped to balance load and manage resource usage. If one container experiences a high volume of traffic, another container for the same function can be started to help share the traffic. As another example, the use of containers can improve reliability. If one of the containers is terminated, crashes, or otherwise ends, other containers continue running and are unaffected. The system can create a new container with an instance of the same software as the container that was terminated. The system can track and store state data about containers, so that the operating state of a container can be recreated later. As another example, the use of containers can facilitate upgrades to portions of the server system with little or no downtime. While the server environment runs a first container with one version of a software module, the system can start running a second container with an upgraded version of the software module.

A container-based server environment can be configured to carry out various analytics functions. For example, a container-based environment can be used to implement a business intelligence system that performs manages databases and data sets, performs data analysis, generates visualizations of data, and generates reports and other documents. Other business intelligence functions include online analytical processing, analytics, data mining, process mining, complex event processing, business performance management, benchmarking, text mining, predictive analytics, and prescriptive analytics.

In one general aspect, a method performed by one or more computers includes: providing a server environment using a plurality of containers that provide instances of different software modules, the plurality of containers including a first container running a first software image of a particular software module; determining that an updated software image is available for the particular software module; in response to the determining that the updated software image is available: (i) starting execution of a second container that provides an instance of the updated software image; (ii) after starting execution of the second container, directing incoming requests to the second container while continuing to process, using the first container, one or more requests that were received before starting execution of the second container; (iii) determining that a level of activity of the first container is below a threshold; and (iv) in response to determining that the level of activity of the first container is below the threshold, stopping execution of the first container.

Implementations may include one or more of the following features. For example, in some implementations, the server environment is configured to provide an analytics service to a plurality of client devices and over a computer network using interactions of the plurality of containers.

In some implementations, the server environment is configured to perform one or more of: generating a visualization; responding to a query; providing a document; generating a report or dashboard; or providing access to a data repository.

In some implementations, providing the server environment includes running the software modules on a cluster of multiple processing nodes, with resources of the cluster of multiple processing nodes being allocated among the respective containers.

In some implementations, determining that the level of activity of the first container is below a threshold includes determining that a number of tasks or sessions in progress for the first container is below a threshold.

In some implementations, directing incoming requests to the second container includes providing requests for new sessions to second container while continuing to provide communications related to existing sessions of the particular software module to the first container.

In some implementations, the method includes, after starting execution of the second container, transferring one or more communication sessions of the first container to the second container such that the second container continues the one or more communication sessions that were initiated with the first container.

In some implementations, transferring the one or more communication sessions of the first container to the second container includes transferring the one or more communication sessions in response to determining that the level of activity of the first container is below the threshold.

In some implementations, the method includes, for at least one of the one or more communication sessions transferred to the second container, generating, by the second container, a response to a request previously routed to the first container.

In some implementations, determining that the updated software image is available for the particular software module includes: determining a first version code associated with a software image of the particular software module that is running in the first container; determining a second version code associated with the updated software image in a software image repository; and determining that the second version code indicates a more recent version than the first version code.

In some implementations, determining that the updated software image is available for the particular software module includes receiving, by one or more computers hosting the server environment, a message indicating that the updated software image is available.

In some implementations, the different software modules are different services or different applications.

In some implementations, the method includes, in response to the determining that the updated software image is available, generating a new container and allocating resources to the new container to serve as the second container; and after stopping execution of the first container, deallocating resources from the first container and removing the first container from the server environment.

In some implementations, the plurality of containers include containers providing external-facing interfaces accessible over a computer network and containers that provide internal interfaces configured to communicate only with other containers in the server environment. The plurality of containers includes a container for each of: a front-end interface module configured to receive user-initiated requests over a network; a library module configured to provide access to a set of documents available through the server environment; one or more analytics modules configured to process queries, generate reports, perform online analytical processing; a collaboration module configured to permit comments and/or notifications to be shared among users of the server environment; and a data access module configured to retrieve information from one or more data sources that include at least one database, data cube, or data set.

In some implementations, starting execution of a second container, directing incoming requests, and stopping execution of the first container are performed such that the server environment transitions from using the first software image to using the updated software image without causing unavailability of the particular software module and in a manner that is transparent to client devices and/or other containers that make use of the particular software module.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
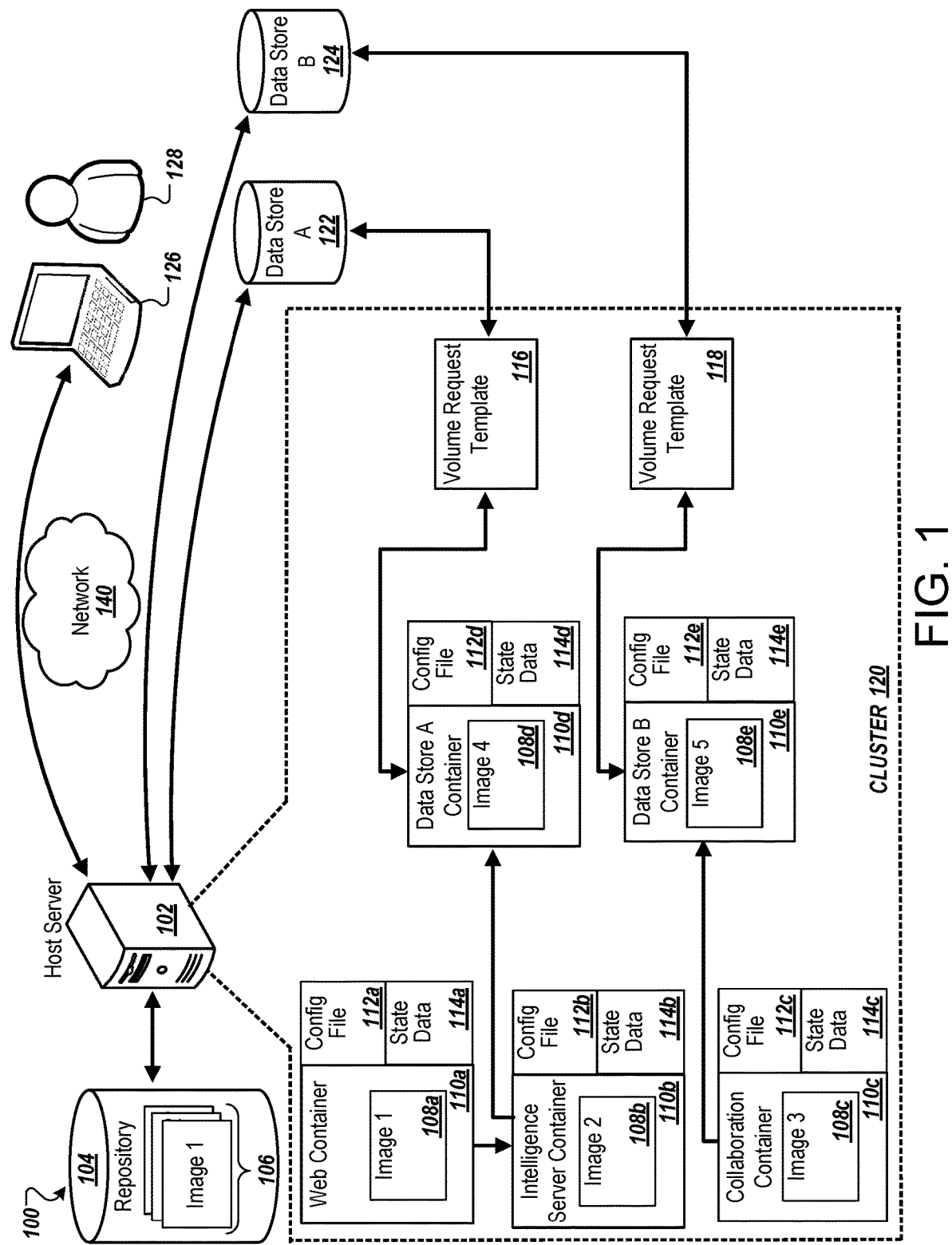
FIG. 1 is a diagram showing an example of a system using a container-based server environment.

FIG. 1 is a diagram showing an example of a system 100 using a container-based server environment. The system 100 includes a host server 102 which runs various containers 110a-110e which each provide a portion of the functionality of a server environment. The containers 110a-110e represent different instances of software images 106 that are available from a repository 104, which may be local or remote with respect to the server 102. The host server 102 may be local, e.g. on-premises, or may be part of a cloud computing service. The host server 102 can provide a cluster 120 of processing nodes that execute the respective containers 110a-110e. As discussed further below, the containers 110a-110e represent instances of applications and/or services that together represent a server environment. For example, the server environment can provide analytics services (e.g., querying, reporting, database access, OLAP, etc.) to various client devices.

In order to manage the containers 110a-110e, the system 100 may leverage one or more container engines or technologies such as, for example, Docker and/or CoreOS rkt. In order to arrange the containers to perform a variety of different server functions, the system 100 may leverage one or more container orchestration engines (COEs) such as, for example, Kubernetes, Mesos, and/or Docker Swarm. These technologies can automate various functions such as creating new containers, initializing or restoring state of the containers, starting execution of containers, monitoring containers, stopping execution of containers, and removing stopped containers from the server environment.

The system 100 includes the host server 102, the repository 104, and an administrator device 126 accessible by an administrator 126. In the illustrated example, the system 100 includes a first data store 122 ("Data Store A") and a second data store 124 ("Data Store B"). The administrator device 126 may communicate with the host server 102 over, for example, the network 140. The host server 102 may communicate with the first data store 122 and the second data store 124 over, for example, the network 140. The host server 102 may communicate with the repository 104 over, for example, the network 140.

The administrator device 126 can be an electronic device such as a computing device. The administrator device 126 can be, for example, a desktop computer, a laptop computer, a smart phone, a cell phone, a tablet, a PDA, etc. The administrator device 126 may be a client device. The administrator device 126 is accessible by a administrator 128, e.g., a software developer, an operator, etc.

The host server 102 is a server system and can include one or more computing devices. In some implementations, the host server 102 is located on the premises of a customer, e.g., on-premises. In other implementations, the host server 102 is not located on the premise of a customer, e.g. off-premise. In these implementations, the host server 102 may be part of a cloud provider, e.g., a third-party server system, such as, for example, Amazon Web Services (AWS), Microsoft Azure, or Google Cloud Platform (GCP). In some implementations, the host server 102 and the administrator device 126 are part of single computer system.

The repository 104 is a data storage containing a collection of images 106. The collection of images 106 being a collection of software images. The collection of images 106 may include various images for differing applications and functions, and/or various images of different versions of the same application or function. In some implementations, the repository 104 is located on the premises of a customer, e.g., on-premises. In other implementations, the repository 104 is not located on the premise of a customer, e.g. off-premise. In these implementations, the repository 104 may be part of a cloud provider, e.g., a third-party server system, such as, for example, Docker Hub, Amazon Web Services (AWS), Microsoft Azure, or Google Cloud Platform (GCP).

The network 140 can include public and/or private networks and can include the Internet.

In general, a software image, such as those included in the collection of images 106, may refer to a snapshot, or template, from which new containers can be started. The software image can be a serialized copy of the entire state of an application or service stored in a non-volatile form, such as one or more files. Software images for containers of container-based environments generally exclude the operating system, but include the application or service, as well as supporting code libraries, dependencies, data sets, and so on that allow the application or service to run on an operating system of a host. The elements of the software image can be configured in a particular state. This package, the software image, is then executable as a container on the operating system of a host system, e.g., a cluster of processing nodes.

In serving as a snapshot or template, a single software image can be used to deploy multiple containers, with each container running a different instance of the same software image. A software image may include all of the components necessary for running a container, e.g., running an independent instance of the application or service for which the software is stored in the software image. These various components may include, for example, dependencies such as libraries and/or tools, code, a configuration file, one or more drivers, and/or settings. The software image may also contain references, pointers, or links to objects such as files outside of the software image and/or the corresponding container. Software images often define an internal file system structure, e.g., with various files organized in folders or directories, so that components of the software image can reference and access each other in a predictable manner. A software image may be composed of a set of read-only layers. A software image may be modified, for example, by adding a new layer to the set of read-only layers. A software image may be associated with a particular application or function. Similarly, the components of a software image may be associated with a particular application or function.

In general, a container may refer to an encapsulated environment in which applications or functions, e.g., services, are run. A container is defined by a software image and by a configuration file. A container is an instance of a software image and has access to the components of the software image. Using containers, the system 100 can run multiple instances of the same software image within different containers.

In general, a cluster represents a set of processing nodes. The processing nodes may each represent physical hardware, such as processors, processor cores, or computers. The processing nodes may additionally or alternatively represent virtualized processing nodes, such as virtual CPUs that represent processing capabilities of a hardware platform but may not be mapped directly to specific hardware processors. Individual containers or groups of containers may be assigned to be run using specific processing nodes or groups of processing nodes. In some implementations, each container is assigned to and run by a different processing node in the cluster. In some implementations, multiple containers are grouped together to be executed by one or more processing nodes of the cluster. For example, a grouping such as a Kubernetes pod may include multiple containers that execute using the same processing node(s).

The techniques disclosed in this document can be used to more conveniently provide server functions. For example, a container-based or "containerized" server environment as shown in FIG. 1 can variety of different server functions without requiring separate servers such as a database server, a document library server, a web server, and a collaboration server. This can greatly streamline the management and maintenance of the server environment, while still providing the same or even more functionality than implementations with stand-alone servers. A container-based server environment also enables centralized management that simplifies the launch and updating of applications and functions.

The techniques disclosed in this document can be used to more efficiently provide server functions. Containers generally utilize fewer resources and less disk space than virtual machines. As a result, compared to stand-alone servers and virtualized servers, a container-based server environment can often provide equivalent performance with fewer hardware resources, or provide greater throughput and capacity using the same level of hardware resources.

Although virtual machines and containers both run on host machines, there are significant differences between them. Typically, a virtual machine is an instance of a distinct computer system including an operating system and any number of installed applications. The virtual machine uses emulation software that runs on a host system, usually a real hardware system although it can also be a virtual one. This is made possible either full virtualization or hardware-assisted virtualization, both providing the emulation layer required to run a guest operating system in full isolation. A typical virtual provides complete isolation in terms of having its own processes, networking, users, etc., which are separate from the host system and other guest systems that may be running alongside it.

Containers are typically instances of software that run on a host machine. Like virtual machines, containers can allow isolated processes, networking, users, etc. However, with containers, a guest operating system is not installed, and the container often includes only the application code needed for a single application. As a result, running the container runs the processes necessary for a particular application or service, without creating the overhead of a guest operating system. Containers can take advantage of the host operating system and layered file system, instead of requiring the emulation layer used to run virtual machines. Because a container doesn't require its own operating system, it uses fewer resources and consumes only the resources required for the application that is run upon starting the container.

In further detail, a virtualized system includes a host operating system and a hypervisor that runs on the host operating system. The hypervisor manages the various virtual machines, providing isolation between the virtual machines and the host operating system. The hypervisor can also provide emulation so each virtual machine can run as if it had direct access to the server hardware. Each virtual machine then includes a guest operating system, its own copy of any libraries or binaries needed, as well as applications run in the virtual machine. Each instance of a virtual machine thus runs its own operating system and its own applications and copies of supporting libraries.

By contrast with the virtualization approach, the container-based approach does not involve a hypervisor or emulation layer. The containers can run on the host operating system and the containers do not include guest operating systems. In some implementations, multiple containers (which may be multiple instances of the same software image) may share certain libraries, binaries, or other resources, which can further improve efficiency.

As shown in FIG. 1, a container-based server environment includes containers 110a-110e running on the cluster 120 of processing nodes provided by the host server 102. Each container 110a-110e has an associated configuration file and state data. Each container runs an instance of a software image, which may be referred to as a container image. The software image includes the executable code for an application or service, as well as dependencies for the application or service. However, the software image for a container does not include an operating system. One or more of the software images 108a-108e within the containers 110a-110e respectively may have been stored in and obtained from the repository 104.

The containers may include containers developed or provided by different parties. For example, containers 110a-110c may be provided by one organization, and containers 110d and 110e may be provided by a different organization. As will be described in more detail with respect to FIG. 2, the variety of containers may include containers for applications and/or functions related to business intelligence (BI). These BI containers may include, for example, a web interface container 110a, an intelligence server container 110b, and a collaboration container 110c. The third-party containers include a data store A container 110d and a data store B container 110e.

The third-party containers 110d and 110e may run third-party applications or functions. These applications or functions may include, for example, applications or functioned related to database management, document databases, distributed streaming platforms, key-value stores or data structure stores, etc. These third-party containers may have one or more corresponding data stores or databases. Here, the container 110d corresponds with a first data store 122 ("Data Store A"), and the container 110e corresponds with a second data store 124 ("Data Store B"). The container 110d is able to communicate with the first data store 122 through a first volume request template 116 in order to, for example, retrieve data from the data store 122 or to push data to the data store 122. The container 110e is able to communicate with the second data store 124 through a second volume request template 118 in order to, for example, pull data from the data store 124 or to push data to the data store 124. The volume request templates 116 and 118 may allow for volume requests to automatically be generated. The volume request templates 116 and 118 may provide templates for volume plugin requests. The volume request template 116 and/or the volume request template 118 may be a volume plugin template. The volume request template 116 and/or the volume request template 118 may be a persistent claim volume template.

Each of the containers 110a-110e may have a corresponding configuration file 112a-112e. When each container 110a-110e is created and initialized, the host server 102 accesses the appropriate configuration file 112a-112e to prepare the container. For example, a configuration file 112a-112e may be a script that the host server 102 runs to modify or configure a software image when the software image is first loaded as a new container. The configuration file may cause the software image to be altered or updated, and/or may specify parameters to be used in operating a container using the software image (e.g., hardware resources needed, network port assignments, etc.). Processing the configuration file for a software image may insert data such as values for settings into the container that is an instance of the software image. The configuration files 112a-112e may be stored in the repository 104 with the software images 106.

The configuration files 112a-112e may include various parameters, such as cache sizes, capacity limits, port assignments, etc. Accordingly, the configuration files 112a-112e may facilitate the deployment of the containers 110a-110e. The administrator 128 can be provided access to create or modify the configuration files 112a-112e through the administrator device 126. In some implementations, configuration files 112a-112e are embedded in a software image.

The images 108a-108e represent software images that an administrator selected from the collection of software images 106 in the repository 104 to be run as containers on the cluster 120.

Figure 4:
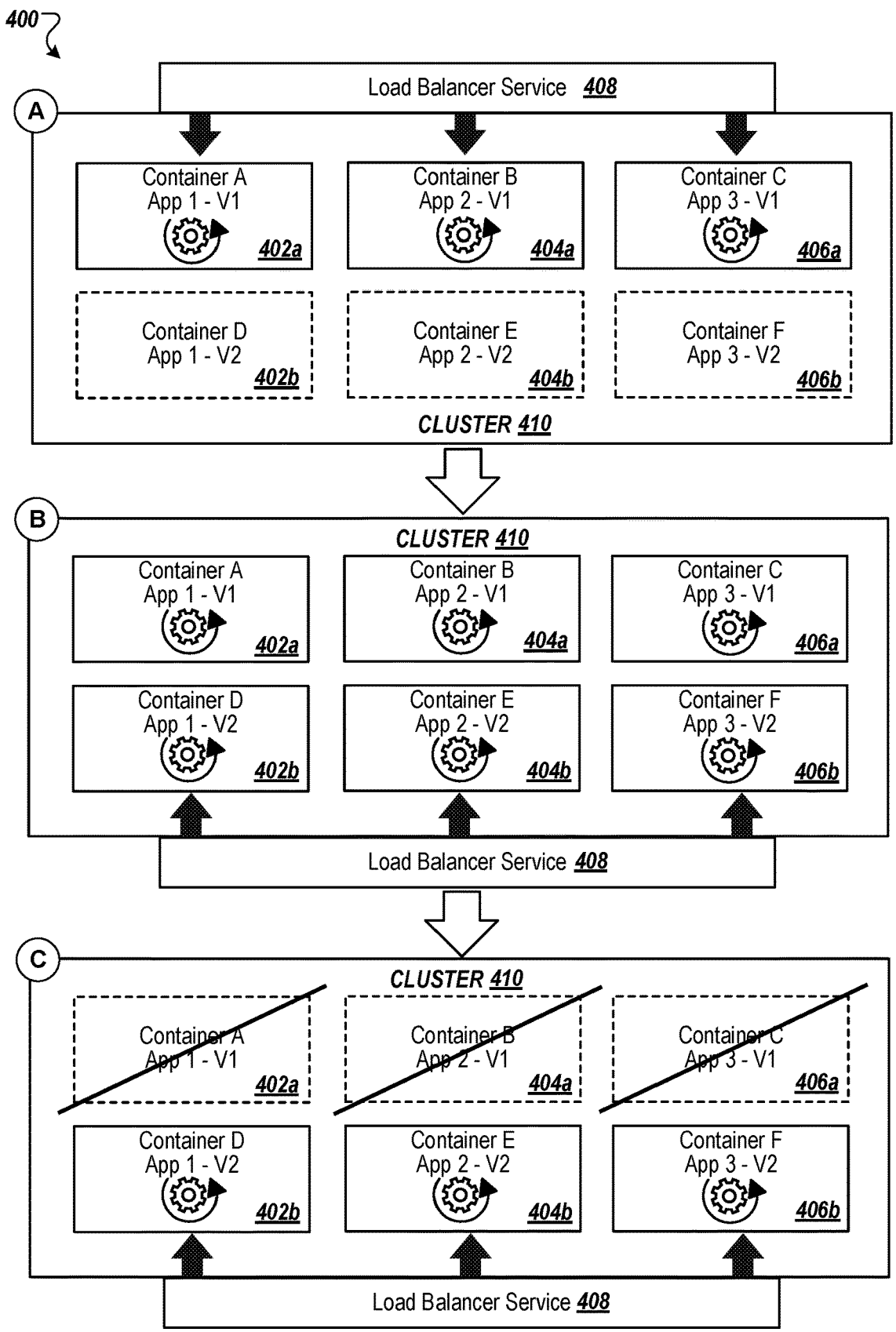
FIG. 4 is a diagram illustrating an example process for updating software in a container-based server environment.

The administrator 128, through the administrator device 126, may modify the images 108a-108e from time to time, for example, to upgrade the applications and services provided by the software images 108a-108e. FIG. 4 shows an example how updated images can be loaded and used in a server environment without disrupting open sessions and operations in progress.

Each of containers 110a-110e has a corresponding set of state data 114a-114e. The state data 114a-114e represents the current state of each container 110a-110e, may include, for example, session-based state data. In some implementations, the state data 114a-114e includes data in addition to session-based state data such as, for example, environment-based state data. If one or more of the containers 110a-110e were to crash or otherwise end, they could effectively be redeployed and brought back to their previous state by the system 100 leveraging the respective state data 114a-114e. For example, if the web interface container 110a were to crash, the session-based state data from the previous session would be stored in the state data 114a. In this example, upon the redeployment of a web interface container having the first image 108a and having the configuration file 112a mounted to it, the state data 114a could be read into the redeployed container in order to return the redeployed container to the previous state of the web interface container 110a.

As shown, the server environment includes the web interface container 110a, the intelligence server container 110b, the collaboration container 110c, the data to the data store A container 110d, the data store B container 110e, the configuration files 112a-112e, the state data 114a-114e, and the volume request templates 116 and 118. The server environment may include other components that are not shown, such as additional containers, configuration files containing deployment instructions for the server environment, etc.

The web interface container 110a includes a first image 108a. The web interface container 110a corresponds with the configuration file 112a and the state data 114a. During the deployment of the server environment, data from the web interface container 110a may be added to the state data 114a. The web interface container 110a may be able to send data to the intelligence server container 110b.

The intelligence server container 110b corresponds with the configuration file 112b and the state data 114b. During the deployment of the server environment, data from the intelligence server container 110b may be added to the state data 114b. The intelligence server container 110b may be able to send data to the data store A container 110d.

The collaboration container 110c corresponds with the configuration file 112c and the state data 114c. During the deployment of the server environment, data from the collaboration container 110c may be added to the state data 114c. The collaboration container 110c may be able to send data to the data store B container 110e.

The data store A container 110d corresponds with the configuration file 112d and the state data 114d. During the deployment of the server environment, data from the data to the data store A container 110d may be added to the state data 114d. The data store A container 110d may be able to send data and receive data from the data store 122 by using the volume request template 116.

The data store B container 110e corresponds with the configuration file 112e and the state data 114e. During the deployment of the server environment, data from the data to the data store B container 110e may be added to the state data 114e. The data store B container 110e may be able to send data and receive data from the data store 124 by using the volume request template 118.

Figure 2:
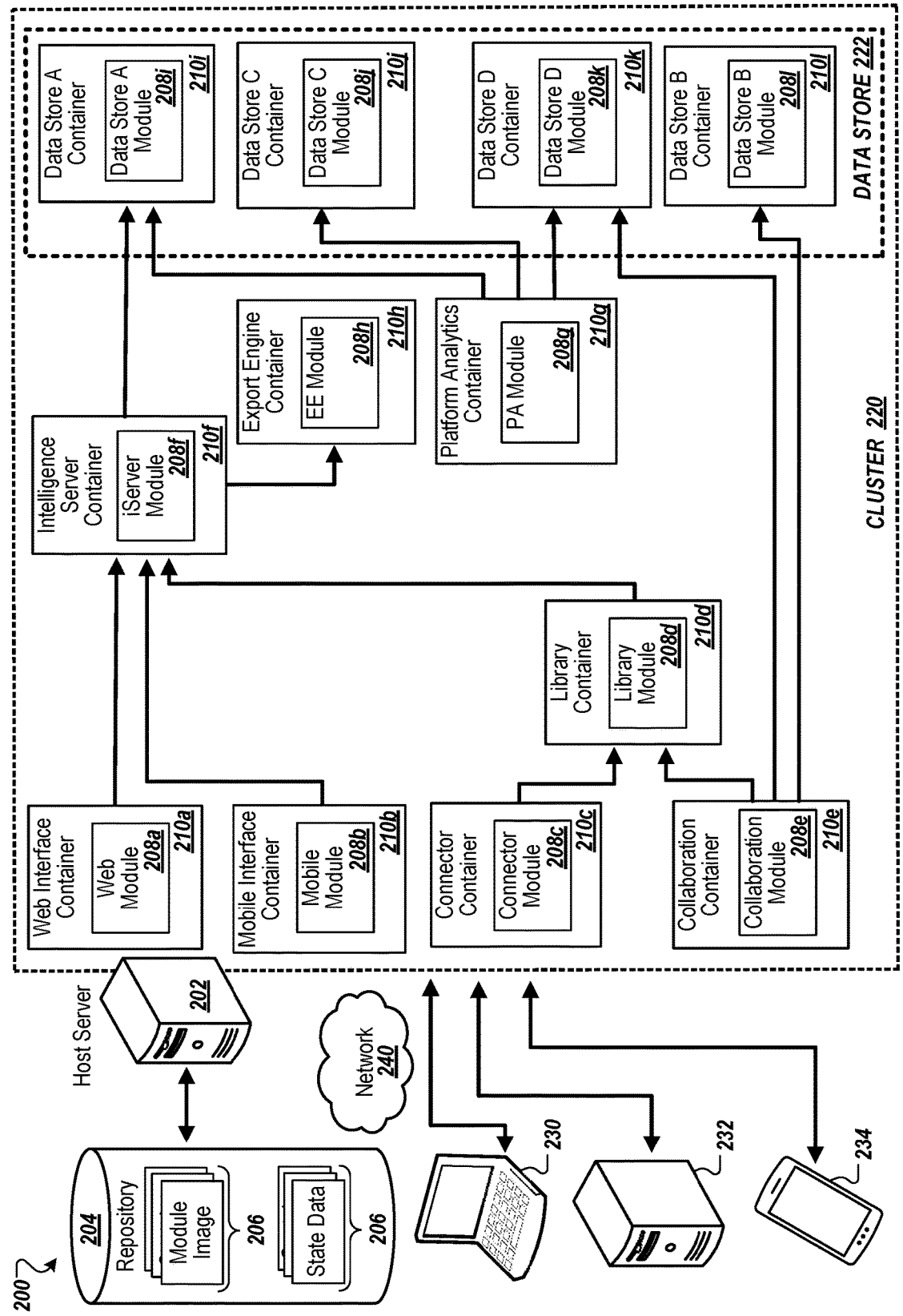
FIG. 2 is another diagram showing an example of a system using a container-based server environment.

FIG. 2 is a diagram showing an example of a system 200 using a container-based server environment. Through the system 200, various containers represent instances of software images running on a host server 202. The host server 202 may access the software images stored on a local or remote repository 204. The host server 202 may be local, e.g. on-premises, or may be part of a cloud computing service. The containers may be used to perform a variety of different server functions.

In order to generate and deploy the containers, the system 200 may leverage one or more container engines or technologies such as, for example, Docker and/or CoreOS rkt. In order to arrange the containers to perform a variety of different server functions, the system 200 may leverage one or more container orchestration engines (COEs) such as, for example, Kubernetes, Mesos, and/or Docker Swarm.

In some implementations, the system 200 is the system 100 as shown in FIG. 1.

The system 200 includes the host server 202 and the repository 204. The system 200 may further include or communicate with a client device 230, a client device 232, and a mobile client device 234. The client devices 230-34 may communicate with the host server 202 over, for example, the network 240.

The client devices 230, 231, 232 can each represent an electronic device such as a laptop computer, a desktop computer, a mobile phone, a smart phone, a tablet, a personal digital assistant, or another computing device.

The host server 202 is a server system and can include one or more computing devices. In some implementations, the host server 202 is located on the premises of a customer, e.g., on-premises. In other implementations, the host server 202 is not located on the premise of a customer, e.g., off-premises. In these implementations, the host server 202 may be part of a cloud provider, e.g., a third-party server system, such as, for example, Amazon Web Services (AWS), Microsoft Azure, or Google Cloud Platform (GCP). In some implementations, the host server 202 is the host server 102 described above with respect to FIG. 1.

The repository 204 is a data storage containing a collection of software images 206. The collection of images 206 may include various images for differing applications and functions, and/or various images of different versions of the same application or function. In some implementations, the repository 204 is located on the premises of a customer, e.g. on-premises. In other implementations, the repository 204 is not located on the premise of a customer, e.g. off-premise. In these implementations, the repository 204 may be part of a cloud provider, e.g., a third-party server system, such as, for example, Docker Hub, Amazon Web Services (AWS), Microsoft Azure, or Google Cloud Platform (GCP). In some implementations, the repository 204 is the repository 104 described above with respect to FIG. 1. In these implementations, the collection of images 206 may be the collection of images 106 described above with respect to FIG. 1.

The network 240 can include public and/or private networks and can include the Internet.

The server environment may include a variety of containers for various server related applications and/or functions. The server environment may include one or more containers for performing processing for analytics, such as business intelligence analytics. For example, as shown the server environment includes the containers 201a-210l where the containers 210a-210g may relate to server analytics. The server environment may include third-party containers. These third-party containers may include containers that are configured to send data to, receive data from, and/or communicate with external data stores and/or databases. Similarly, the third-party containers may be instances of software images developed and/or provided by third parties. These containers 210i-210l can be third-party containers.

The server environment may include various components not shown. For example, the server environment may include various configuration files for the containers 210a-210l, various state data for each of the containers 210a-210l, volume request templates for the data store 222 containers 210i-210l to allow the containers 210i-210l to communicate with external data stores or databases, a configuration file for the server environment, other containers, etc.

The client devices 230-234 may be able to interact with the server environment through front-end interface services or functions of the server environment. As will be described in more detail below, these front-end interface services or functions may include, for example, the web interface container 210a, the mobile interface container 210b, and the library container 210d. Other containers in the server environment may be back-end containers. These back-end containers may include, for example, the intelligence server container 210f, the export engine container 210h, and the data store containers 210i-210l.

The web interface container 210a includes a web module image 208a. The web module image 208a may be stored in and obtained from the collection of images 206 of the repository 204. The web interface container 210a may provide a front-end interface that can interact with the client devices 230-232. Users of one or more of the client devices 230-232 may be able to use the web interface container 210a for analytics and/or BI. For example, users of one or more of the client devices 230-232 may be able to use the web interface container 210a for BI reporting, analysis, and/or monitoring. For example, the web interface container 210a may provide users of the client devices 230-232 a single, unified web interface in which to perform the major styles of BI such as, for example, scorecards and dashboards, enterprise reporting, online analytical processing (OLAP) analysis, predictive analysis, and alerts and proactive notification. The web interface container 210a may allow users to move seamlessly between the various styles of BI and to combine multiple styles in a single report display.

The web interface container 210a can provide data to the intelligence server container 210f.

In some implementations, the web interface container 210a is the web interface container 110a as shown in FIG. 1.

The mobile interface container 210b includes a mobile module image 208b. The mobile module image 208b may be stored in and obtained from the collection of images 206 of the repository 204. The mobile interface container 210b may provide a front-end interface that can interact with the mobile client device 234. Users of the mobile client device 234 may be able to use the mobile interface container 210b for analytics and/or BI. For example, users of one or more of the mobile client device 234 may be able to use the mobile interface container 210b for BI reporting and analysis. The mobile interface container 210b may recognize touch and smart gestures placed by users through the mobile client device 234.

The mobile interface container 210b can provide data to the intelligence server container 210f.

The connector container 210c includes a connector module image 208c. The connector module image 208c may be stored in and obtained from the collection of images 206 of the repository 204. The connector container 210c may allow for the importation of data into the server environment from various data sources. For example, users of the client devices 230-232 may be able to use the connector container 210c to import data into the server environment from various data sources.

The connector container 210c can provide data to the library container 210d.

The library container 210d includes a library module image 208d. The library module image 208d may be stored in and obtained from the collection of images 206 of the repository 204. The library container 210d may provide a front-end interface that can interact with the client devices 230-234. Users of one or more of the client devices 230-234 may be able to use the library container 210d for analytics and/or BI. For example, users of one or more of the client devices 230-234 may be able to use the library container 210d for BI reporting and analysis. As an example, the library container 210d may provide users of the client devices 230-234 an interface to view, analyze, and consume various reports and documents.

The library container 210d can provide data to the intelligence server container 210f.

The collaboration container 210e includes a collaboration module image 208e. The collaboration module image 208e may be stored in and obtained from the collection of images 206 of the repository 204. The collaboration container 210e may allow users of the client devices 230-234 to access shared content, to search through documents or reports, to share content, to interact with other users, to monitor other users, to monitor other users' actions, etc.

The collaboration container 210e can provide data to the library container 210d, to the data store D container 210k in the, and to the data store B container 210l.

The intelligence server container 210f includes an intelligence server ("iServer") module image 208f. The intelligence server module image 208f may be stored in and obtained from the collection of images 206 of the repository 204. The intelligence server container 210f may provide an analytics and/or BI platform. The intelligence server container 210f may provide an analytics and/or BI platform that can be used by other applications or functions such as the applications and/or functions deployed in one or more of the other containers 210a-210e, and 210g-210l. For example, the intelligence server container 210f may provide an integrated platform for BI monitoring, reporting, and analysis.

The intelligence server container 210f can provide data to the export engine container 210h, and to the data store A container 210i.

In some implementations, the intelligence server container 210f is the intelligence server container 110b as shown in FIG. 1.

The platform analytics container 210g includes a platform analytics ("PA") module image 208g. The platform analytics module image 208g may be stored in and obtained from the collection of images 206 of the repository 204. The platform analytics container 210g may provide monitoring capabilities. For example, the platform analytics container 210g may provide a monitoring tool to collect platform data, e.g. telemetry. The platform analytics container 210g may allow for the collection of data from various server environments, users, e.g. users of the client devices 230-234, data cubes, etc.

The platform analytics container 210g can provide data to the data store A container 210i, the data store C container 210j, and the data store D container 210k.

The export engine container 210h includes a new export engine ("NEE") module image 208h. The export engine module image 208h may be stored in and obtained from the collection of images 206 of the repository 204. The export engine container 210h may provide a conversion function. This conversion function may be used, for example, by the intelligence server container 210f. For example, the intelligence server container 210f may use the export engine container 210h to convert various documents, reports, and dashboards into particular file types or formats. As an example, the intelligence server container 210f may use the export engine container 210h to create PDF files from various documents, reports, and dashboards.

The data store A container 210i is located and includes a data store A module image 208i. The data store A module image 208i may be stored in and obtained from the collection of images 206 of the repository 204. The data store A container 210i may provide an application or function associated with an external data store or database. For example, the data store A container 210i may provide an application or function associated with the data store 122 shown in FIG. 1.

In some implementations, the data store A container 210i is the data store A container 110d as shown in FIG. 1.

The data store C container 210j is located and includes a data store C module image 208j. The data store C module image 208j may be stored in and obtained from the collection of images 206 of the repository 204. The data store C container 210j may provide an application or function associated with an external data store or database.

The data store D container 210k is located and includes a data store D module image 208k. The data store D module image 208k may be stored in and obtained from the collection of images 206 of the repository 204. The data store D container 210k may provide an application or function associated with an external data store or database.

The data store B container 210l is located and includes a data store B module image 208l. The data store B module image 208l may be stored in and obtained from the collection of images 206 of the repository 204. The data store B container 210l may provide an application or function associated with an external data store or database. For example, the data store B container 210l may provide an application or function associated with the data store 124 shown in FIG. 1.

In some implementations, the data store B container 210l is the data store B container 110e as shown in FIG. 1.

Figure 3:
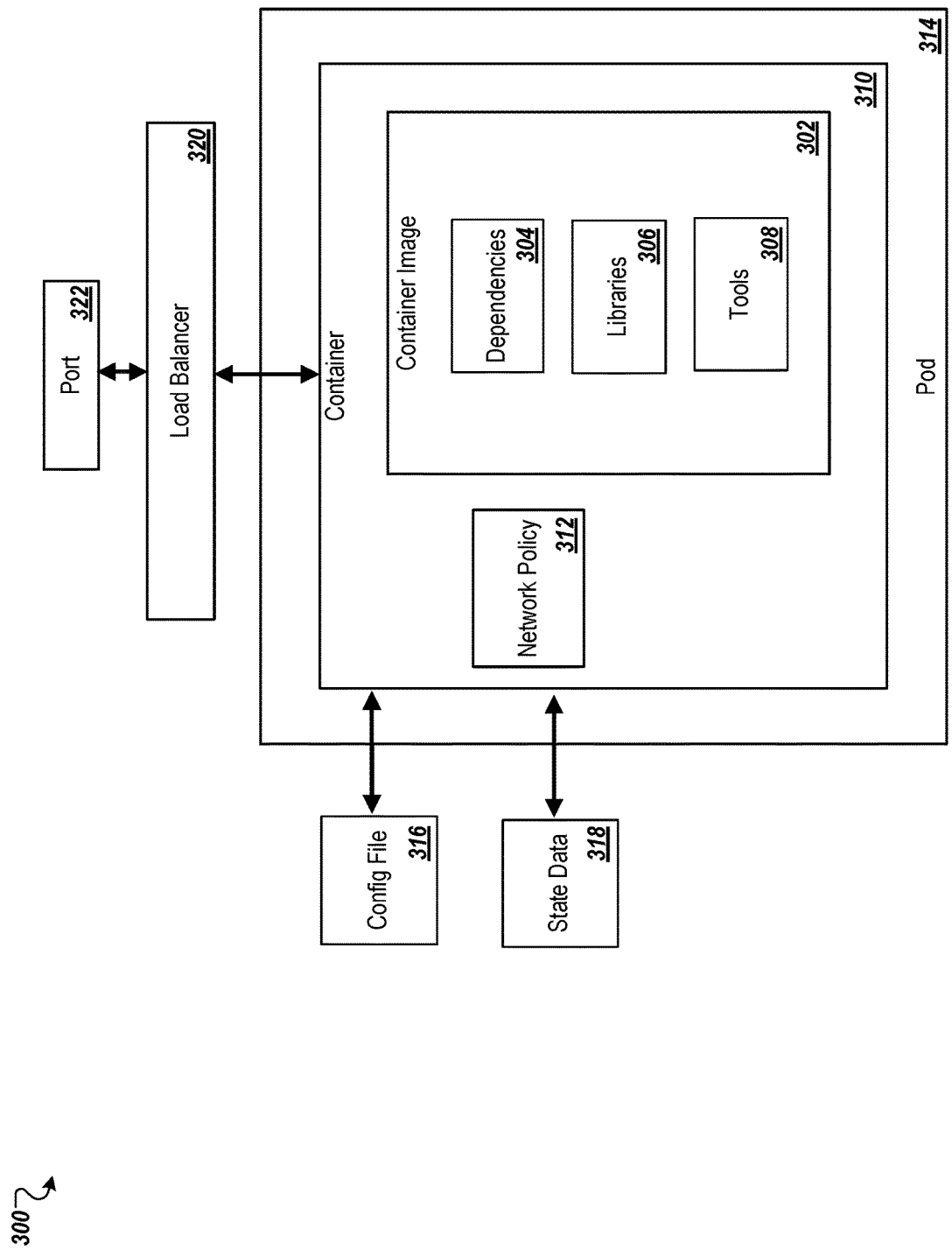
FIG. 3 is a diagram illustrating an example of a container and associated data.

FIG. 3 is a diagram illustrating an example container architecture 300. As shown, the architecture includes a container 310 in a pod 314, a configuration file 316, state data 318, a load balancer 320 used to balance the load or traffic over one or more containers including the container 310, and a port 322 in order to allow communication between the container 310 and other containers, external applications or functions, or users. Each of the containers 110a-110e and 210a-210l can be implemented using some or all of the features of the container architecture 300.

A pod, such as the pod 314, may be a management component that is used by a container management platform to organize and/or deploy one or more containers.

The container 310 includes a software image 302. The container 310 is running an instance of the software image 302. The software image 302 is associated with a specific application or function such as, for example, a server service. Accordingly, the container 310, when deployed, is running the specific application or function associated with the software image 302.

The software image 302 may include a variety of components. These variety of components may be components corresponding to the specific application or function associated with the software image 302. These variety of components may include dependencies 304, libraries 306, and/or tools 308. The dependencies 304 may include dependencies need by the specific application or function associated with the software image 302. The dependencies 304 may include specific versions of programming language runtimes and other software libraries. In some implementations, the dependencies 304 include the libraries 306. In some implementations, the dependencies 304 include the tools 308. The libraries 306 may include system libraries and/or system settings. The tools 308 may include system tools. The software image 302 may also include code for the specific application or function associated with the software image 302.

However, neither the software image 302 nor the container 310 that represents the instantiation of the software image 302 includes an operating system (OS). Instead the container 310 may run on the operating system of the underlying system such as, for example, the operating system of the host server 102 shown in FIG. 1 or the host server 202 shown in FIG. 2.

The container 310 also includes a network policy 312. The network policy 312 may specify how the container 310 and/or pod 314 is allowed to communicate with other containers, pods, and/or other network endpoints. For example, the network policy 312 may make the application or function of the container 310 only accessible from in the pod 314 and/or the container 310 itself. As another example, the network policy 312 may expose the application or function of the container 310 to only other containers, e.g. other containers in the same cluster, or only to specific other containers, e.g. specific other containers in the same cluster. As another example, the network policy 312 may make the application or function of the container 310 accessible from anywhere, e.g., the container 310 is made accessible outside of its associated cluster. In some implementations, the network policy 312 is located outside of the container 310 but in the pod 314.

The configuration file 316 may be read into the container 310. Accordingly, the configuration file 316 may be mounted to the containers 310. The configuration file 316 may include various parameters, may include an indication of the software image 302, may include instructions to pull the software image 302 from a collection of images stored on a repository, etc. The parameters in the configuration file 316 may include, for example, a cache size, capacity limits, port assignments, etc. The configuration file 316 may be used to effectuate the deployment of the container 310. The configuration file 316 may have been generated or modified by an operator, developer, or administrator of the container 310 or of a cluster that the container 310 is part of.

In some implementations, the configuration file 316 is embedded in the container 310 by, for example, an operator, developer, or administrator of the container 310 or of a cluster that the container 310 is part of.

In some implementations, the configuration file 316 is embedded in the software image 302 by, for example, an operator, developer, or administrator of the container 310 or of a cluster that the container 310 is part of prior to the instance of the container being run in a container.

The state data 318 may include, for example, session-based state data. Data from the container 310 may be added to the state data 318 during the deployment of the container 310. In some implementations, the state data 318 includes data in addition to session-based state data such as, for example, environment-based state data. If the container 310 were to crash or otherwise end, a system, e.g. the system 100 as shown in FIG. 1, could effectively redeploy the container 310 by deploying a new instance of the software image 302 and leveraging the state data 318 to bring the redeployed container to the previous state of the container 310.

FIG. 4 is a diagram illustrating an example process 400 for deploying new container instances. This can include transitioning from that is seamless, e.g., without downtime or unavailability, to client devices and other containers of the environment.

FIG. 4 also illustrates various events, shown as stages (A) to (C), with each representing a step in an example process for deploying new container instances. Stages (A) to (C) may occur in the illustrated sequence, or in a sequence that is different from the illustrated sequence. For example, some of the stages may occur concurrently.

The system, such as the system 100 shown in FIG. 1, may be able to deploy new container instances of corresponding applications without immediately replacing or ending existing container instances of those same corresponding applications such that the new container instances and the existing container instances can run in parallel. The system 100 may deploy these new container instances in the same container-based server environment, such as the same cluster, where the existing container instances have already been deployed. Although the existing container instances are not immediately replaced by the new container instances or immediately ended as a result of initiating the process for deploying the new container instances, the new container instances of the corresponding applications are meant to eventually replace the existing container instances of those same corresponding applications.

The system 100 shown in FIG. 1 may initiate the process of deploying the new container instances to replace the existing container instances for various reasons. For example, the system 100 may initiate the process of deploying a new container instance of a corresponding application due to the new container instances having an updated or different software image. The updated or different software image may represent a new version of the corresponding application. The updated or different software image may include new or modified dependencies, libraries, tools, settings, etc.

During the process of deploying the new container instances, while preparing the new container instances, the system 100 shown in FIG. 1—e.g. through load balancer services 408—may continue to provide requests to the existing container instances in a manner that is substantially equivalent to request allocation prior to the start of this deployment process. Similarly, during the process of deploying the new container instances, while the system 100 prepares the new container instances, the existing container instances may continue to process any received or previously received requests in a manner that is substantially equivalent to request processing prior to the start of this deployment process.

Once a new container instance of a particular application has been deployed, the system 100 shown in FIG. 1—e.g. through the load balancer services 408—may begin sending requests that would have been provided to the existing container instance of that application to the new container instance of that application. However, in some implementations, the system 100—e.g. through the load balancer services 408—may provide the new container instance of that particular application with only a portion of the requests that would have been provided to the existing container instance of that application due to, for example, differences between the new container instance and the existing container instance (e.g., the new and existing container instances using different software images, each corresponding with a different software version of the same application). Similarly, in some implementations, the system 100—e.g. through the load balancer services 408—may provide the new container instance of that particular application with one or more requests that would not have been provided to the existing container instance of that application due to, for example, differences between the new container instance and the existing container instance (e.g., the new and existing container instances using different software images, each corresponding with a different software version of the same application). When the new container instances begin receiving requests, they may start processing those requests.

Once a new container instance of a particular application has been deployed, the system 100 shown in FIG. 1—e.g. through the load balancer services 408—may stop providing requests to the existing container instance of that application. However, the system 100 might not immediately end the existing container instance once the new container instance of the same application has been deployed. For example, if the existing container instance still includes a queue of received requests, the existing container may continue to exist while it continues to process those requests.

After an existing container instance of a particular application has finished processing all of its previously received requests, the system 100 shown in FIG. 1 may determine that the existing application has finished process its requests and proceed to end the existing container instance of that application. In ending the existing container instance of that application, the system 100 has completed the deployment process of the new container instance of that same application.

In stage (A), existing containers 402a, 404a, and 406a are processing requests and new containers 402b, 404b, and 406b are being prepared in order to be deployed. The existing containers 402a, 404a, and 406a are processing requests provided to them through the load balancer services 408. The load balancing services 408 may include one or more load balancers. Using a load balancer may improve individual container performance and performance of the cluster 410 by spreading the load, e.g. request traffic, over the containers in the cluster 410. Processing requests may involve, for example, processing data, loading data, sending data, etc.

The container 402a is a container for a first application ("App 1"). The container 402a may be running an instance of a software image for a first version ("V1") of App 1. The container 404a is a container for a second application ("App 2"). The container 404a may be running an instance of a software image for a first version ("V1") of App 2. The container 406a is a container for a third application ("App 3"). The container 404a may be running an instance of a software image for a first version ("V1") of App 3.

The container 402b being prepared is another container for App 1. The container 402b may be configured to run an instance of a software image for a second version ("V2") of App 1. The second version may correspond with an upgraded software image or otherwise modified software image for App 1. The second version may correspond with a new software image for App 1.

The container 404b being prepared is another container for App 2. The container 404b may be configured to run an instance of a software image for a second version ("V2") of App 2. The second version may correspond with an upgraded software image or otherwise modified software image for App 2. The second version may correspond with a new software image for App 2.

The container 406b being prepared is another container for App 3. The container 406b may be configured to run an instance of a software image for a second version ("V2") of App 3. The second version may correspond with an upgraded software image or otherwise modified software image for App 3. The second version may correspond with a new software image for App 3.

In preparing to deploy the new containers 402b, 404b, and 406b, the cluster 410 may pull the upgraded, modified, or new images for App 1, App 2, and App 3, respectively. The cluster 410 may pull the images from, for example, a software image repository such as the repository 104 shown in FIG. 1 or the repository 204 shown in FIG. 2.

The cluster 410 may start preparing the new containers 402b, 404b, and 406b in response to receiving instructions from, for example, an operator, developer, or administer of the cluster 410. The cluster 410 may start preparing the new containers 402b, 404b, and 406b in response to receiving upgraded, modified, or new images for App 1, App 2, and App 3 from, for example, an operator, developer, or administer of the cluster 410. The cluster 410 may start preparing the new containers 402b, 404b, and 406b in response to a triggering event, such as detecting that upgraded, modified, or new images for App 1, App 2, and App 3 are available.

In stage (B), the containers 402b, 404b, and 406b are deployed and the load balancer service 408 starts feeding requests to the containers 402b, 404b, and 406b for processing. The requests sent to the containers 402b, 404b, and 406b may correspond with requests that may have been sent to the containers 402a, 404a, and 406a, respectively. For example, the container 402b may receive requests from the load balancer service 408 that would have been sent to the container 402a. As another example, the container 404b may receive requests from the load balancer service 408 that would have been sent to the container 404a. As another example, the container 406b may receive requests from the load balancer service 408 that would have been sent to container 406b.

In stage (B), the containers 402a, 404a, and 406a continue to process requests that they had previously received from the load balancer service 408. However, the containers 402*a*, 404*a*, and 406*a* stop receiving new requests from the load balancer service 408.

In stage (C), the containers 402*a*, 404*a*, and 406*a* finish processing their respective requests and are terminated. The cluster 410 may end each of the containers 402*a*, 404*a*, and 406*a* upon determining that the containers 402*a*, 404*a*, and 406*a* have finished processing their requests respectively. For example, once the container 402*a* finishes processing previously received requests, the cluster 410 terminates the container 402*a*. As another example, once the container 404*a* finishes processing previously received requests, the cluster 410 terminates the container 404*a*. As another example, once the container 406*a* finishes processing previously received requests, the cluster 410 terminates the container 406*a*.

The containers 402*b*, 404*b*, and 406*b*, which remain active, continue processing requests from the load balancer service 408. As a result of the process shown in FIG. 4, the applications 1-3 have been upgraded to newer versions without interrupting the availability of the applications, and in a manner that is transparent to end users and other containers. The containers 402*b*, 404*b*, and 406*b* running the updated software images continue to operate within the server environment.

Figure 5:
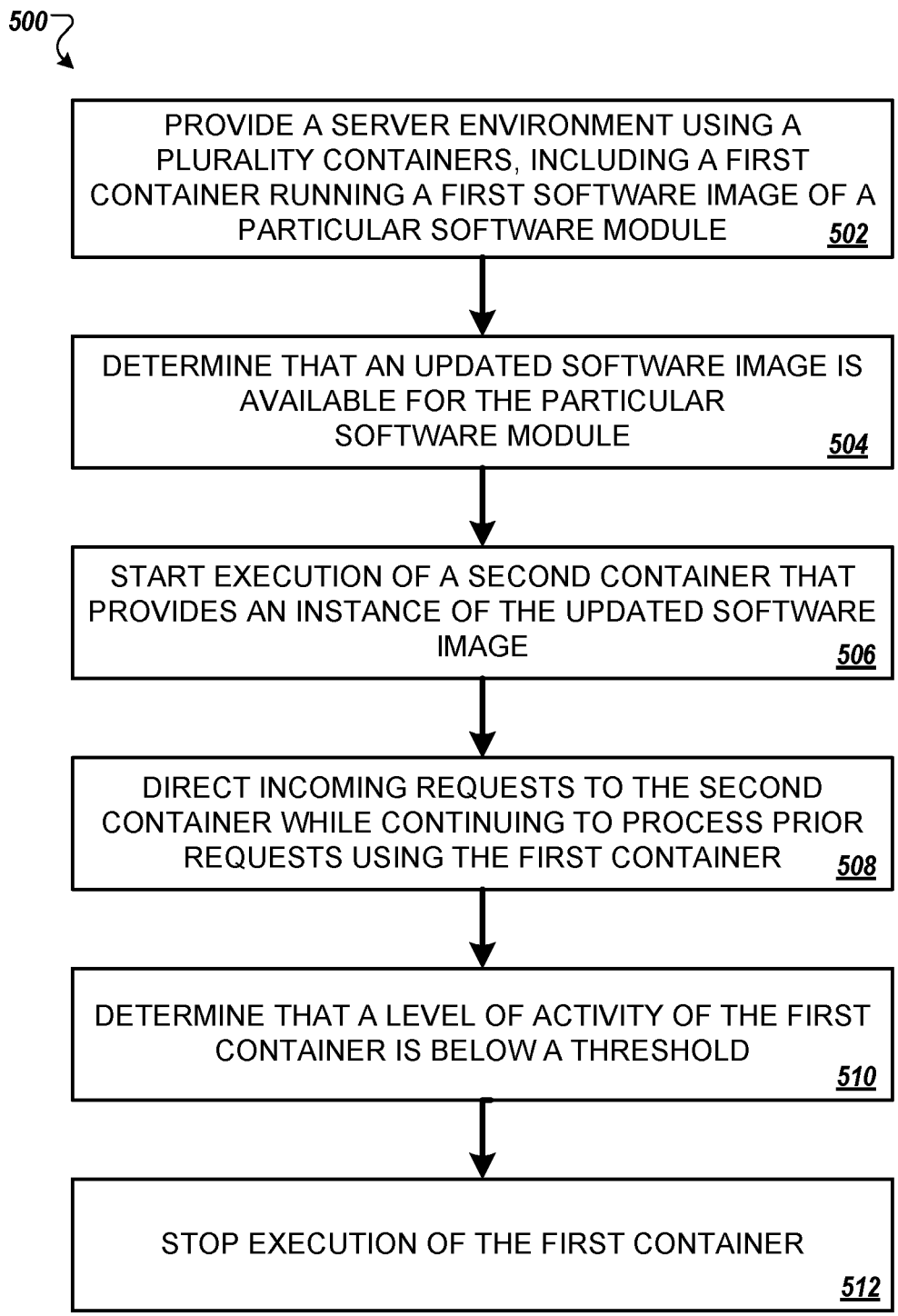
FIG. 5 is a flow diagram showing an example of a process 500 for loading containers in a container-based server environment.

FIG. 5 is a flow diagram showing an example of a process 500 for loading containers in a container-based server environment. The process 500 shows how a container of a container-based server environment may be updated with minimal or no interruption of service provided by the server environment. Briefly, in a server environment running a first container, a new version of the first container (e.g., a version that is patched, is updated, has changed settings, etc.) can be automatically loaded and run in parallel with the first container. After the new version of the container is running, incoming requests are routed to the new container. Meanwhile, earlier requests and tasks in progress at the first container continue to be processed by the first container, in many cases to completion. Once the load at the first container falls below a predetermined level, the first container is stopped and removed from the server environment. This process enables the system to effectively replace a container with the old software image with a container based on a new software image, without any interruption in service.

The system provides a server environment using a plurality of containers that provide instances of different software modules (502). The different software modules are different services or different applications. The plurality of containers can include a first container running a first software image of a particular software module. The containers can be run on a cluster of multiple processing nodes, with resources of the cluster of multiple processing nodes being allocated among the respective containers. The processing nodes may represent actual processors or virtual processing nodes.

The system determines that an updated software image is available for the particular software module (504). This may occur automatically, for example, as triggered by the system based on detecting a new software image, or detecting that a timestamp or version code for a software image has changed. For example, the system may detect that a timestamp or image identifier for a software image in an image repository is newer than the timestamp or identifier for the software image of the first container. Metadata of the image repository may similarly indicated when a new version is made available. The determination may be based on user input, such as user input that selects a software image or otherwise manually initiates an update to a software image for an application. The determination may be based on a message, such as from a software image repository server or other system, indicating that the updated software image is available.

As an example, the system may determine a first version code associated with a software image of the particular software module that is running in the first container. The system may determine a second version code associated with the updated software image in a software image repository. The system may determine that the second version code indicates a more recent version than the first version code. When version codes are incremented or otherwise follow a certain convention to be assigned, the system may use data indicating the convention to detect a newer version (e.g., determining that a version code is higher than the previous version code).

In response to the determining that the updated software image is available, the system performs operations of steps (506) to (512) discussed below. The steps to detect the availability of the updated software image and to create and switch to using the updated software image can be performed automatically by the system. As an alternative, these steps may be manually initiated based on user input, such as when a user selects or creates an updated software image to be used in the server environment.

The system starts execution of a second container that provides an instance of the updated software image (506). For example, the system generates a new container based on the updated software image, allocates resources to the new container, and uses the new container as the second container.

After starting execution of the second container, the system directs incoming requests to the second container (508). The system continues to process, using the first container, one or more requests that were received before starting execution of the second container. As a result, both the first container and the second container, which may both represent different versions of the same application, operate concurrently to process their respective sets of requests. For example, requests to initiate new sessions can be provided to the second container, which will handle the new sessions going forward. Meanwhile, the system continues to provide communications related to existing sessions of the particular software module to the first container. As a result, the first container and the second container, representing instances of different versions of the same application or service, can concurrently process data for their respective sessions which are open concurrently.

The system determines that a level of activity of the first container is below a threshold (510). The system can monitor the load or other activity of the first container, e.g., the number of tasks in progress, a number of tasks in a queue of pending jobs, a number of network connections open, an amount of network traffic, a load level, a resource usage (e.g., CPU utilization, RAM usage, etc.), and so on. For example, the system can determine that the level of activity of the first container is below a threshold because a number of tasks or sessions in progress for the first container is below a threshold. The system may monitor various operational or performance characteristics of the first container to determine the current level of activity, including network traffic, executing processes, network connections, resource utilization, and so on.

In response to determining that the level of activity of the first container is below the threshold, the system stops execution of the first container (512). The system can also remove the first container from the server environment. For example, the system can deallocate resources from the first container and can remove the first container from the server environment, thus reclaiming the memory and other resources that were used by the first container.

In general, starting execution of a second container, directing incoming requests to the second container, and stopping execution of the first container are performed such that the server environment transitions from using the first software image to using the updated software image without causing unavailability of the particular software module and in a manner that is transparent to client devices and/or other containers that make use of the particular software module.

In some implementations, associated with stopping the first container, the system provides notifications to client devices with pending jobs or sessions that their sessions or jobs have been cancelled and should be issued again. In other implementations, the system automatically determines which requests to the first container are unfulfilled and re-issues the unfulfilled requests to the second container. As discussed below, this can enable the requests to be addressed by the second container without requiring client devices to re-issue their requests.

In some implementations, after starting execution of the second container, the system transfers one or more communication sessions of the first container to the second container. The second container then continues the one or more communication sessions that were initiated with the first container. The transfer may occur in response to determining that the level of activity of the first container is below the threshold. For example, when the system determines that the activity level on the first container has fallen below a threshold level (e.g., a predetermined amount of active sessions, active users, pending tasks, etc.), the system may stop processing on the first container and shift future processing to the second container. This may be done in various ways. As an example, a record of active sessions of the first container, along with related information for the sessions (e.g., user identifiers, authentication or authorization tokens, session identifiers, working data sets, etc.) can be provided to the second container. As a result, the second container can open sessions that match the existing sessions. As another option, with the session information, the second container may use the session information to create new sessions for the same users or devices as the old sessions, and can provide the new session information to the users or devices.

If a request is provided to the first container but not yet fulfilled by the first container when the first container is stopped, the request and any associated data can be provided to second container. For example, the system can effectively repeat or re-issue, to the second container, the request that was previously issued to the first container, with the second container being provided the session history and other data that may be needed to fulfill the request. The second container can then provide a response to a request previously routed to the first container.

In some cases, the system may extract and transfer state information about work in progress at the first container to the second container. As an example, consider a case where the first container is has generated 100 pages of a 500-page report when the system determines to stop the first container. The system can transfer the data for the report generation task, such as temporary files, cached data, partially completed objects, and so on to the second container and request that the second container complete the task. This may involve the system generating a customized request (e.g., different from the initial request from the client device) that refers to the resources representing partial work completed and limits the amount of processing requested to the amount still needed for completion.

In some implementations, the server environment is configured to provide an analytics service to a plurality of client devices and over a computer network using interactions of the plurality of modules running in the respective containers. The server environment may be configured to perform analytics tasks such as generating a visualization, responding to a query, generating a report or dashboard, and/or providing access to a database.

The server environment can provide business intelligence applications and services. In some implementations, the plurality of containers includes containers providing external-facing interfaces accessible over a computer network and containers that provide internal interfaces configured to communicate only with other containers in the server environment. The plurality of containers includes a container for each of: a front-end interface module configured to receive user-initiated requests over a network; a library module configured to provide access to a set of documents available through the server environment; one or more analytics modules configured to process queries, generate reports, perform online analytical processing; a collaboration module configured to permit comments and/or notifications to be shared among users of the server environment; and a data access module configured to retrieve information from one or more data sources that include at least one database, data cube, or data set.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, comprising:
    providing a server environment using a plurality of containers that provide instances of different software modules, the plurality of containers including a first container running a first software image of a particular software module;
    determining that an updated software image is available for the particular software module;
    in response to the determining that the updated software image is available, starting execution of a second container that provides an instance of the updated software image;
    after starting execution of the second container, directing incoming requests to the second container while continuing to process, using the first container, a set of tasks that were initiated based on requests received before starting execution of the second container;

executing the first container and the second container concurrently for a period of time while a level of activity of the first container is above a predetermined activity threshold for stopping execution of the first container, wherein the predetermined activity threshold is set at a level of activity that the first container can reach while the first container is actively processing one or more tasks in the set of tasks;

while the first container and second container are executing concurrently and while the first container processes one or more tasks in the set of tasks:

monitoring the first container to determine whether the level of activity of the first container while processing the one or more tasks is below the predetermined activity threshold; and determining, based on the monitoring, that the level of activity of the first container while processing the one or more tasks is below the predetermined activity threshold; and in response to determining that the level of activity of the first container is below the predetermined activity threshold and before the first container completes all of the tasks in the set of tasks:

(i) disposing of at least one task in progress at the first container by at least one of:

cancelling the at least one task at the first container without initiating the at least one task at the second container, transferring the at least one task and partial results of the at least one task from the first container to the second container such that the second container performs additional processing for the at least one task and combines results of the additional processing with the partial results from the first container, or issuing to the second container a request for the second container to initiate processing of the at least one task, and (ii) stopping execution of the first container without completing the at least one task with the first container.

2. The method of claim 1, wherein the server environment is configured to provide an analytics service to a plurality of client devices over a computer network using interactions of the plurality of containers.

3. The method of claim 1, wherein the server environment is configured to perform one or more of:
generating a visualization;
responding to a query;
providing a document;
generating a report or dashboard; or
providing access to a data repository.

4. The method of claim 1, wherein providing the server environment comprises running the software modules on a cluster of multiple processing nodes, with resources of the cluster of multiple processing nodes being allocated among the respective containers.

5. The method of claim 1, wherein determining that the level of activity of the first container is below the predetermined activity threshold comprises determining that a number of tasks or sessions in progress for the first container is below the predetermined activity threshold.

6. The method of claim 1, wherein directing incoming requests to the second container comprises providing requests for new sessions to the second container while continuing to provide communications related to existing sessions of the particular software module to the first container.

7. The method of claim 1, wherein disposing of the at least one task of the first container comprises transferring the at least one task to the second container, including:

after starting execution of the second container and in response to determining that the level of activity of the first container is below the predetermined activity threshold, transferring one or more communication sessions of the first container to the second container such that the second container continues the one or more communication sessions that were initiated with the first container.

8. The method of claim 1, wherein determining that the updated software image is available for the particular software module comprises:

determining a first version code associated with a software image of the particular software module that is running in the first container;

determining a second version code associated with the updated software image in a software image repository; and determining that the second version code indicates a more recent version than the first version code.

9. The method of claim 1, wherein determining that the updated software image is available for the particular software module comprises receiving, by one or more computers hosting the server environment, a message indicating that the updated software image is available.

10. The method of claim 1, wherein the plurality of containers include containers providing external-facing interfaces accessible over a computer network and containers that provide internal interfaces configured to communicate only with other containers in the server environment, wherein the plurality of containers includes a container for each of:

a front-end interface module configured to receive user-initiated requests over a network;

a library module configured to provide access to a set of documents available through the server environment;

one or more analytics modules configured to process queries, generate reports, perform online analytical processing;

a collaboration module configured to permit comments and/or notifications to be shared among users of the server environment; and a data access module configured to retrieve information from one or more data sources that include at least one database, data cube, or data set.

11. The method of claim 1, wherein starting execution of a second container, directing incoming requests, and stopping execution of the first container are performed such that the server environment transitions from using the first software image to using the updated software image without causing unavailability of the particular software module and in a manner that is transparent to client devices and/or other containers that make use of the particular software module.

12. The method of claim 1, wherein the predetermined activity threshold specifies a level of computing resource utilization, and wherein monitoring the first container comprises monitoring whether computing resource utilization of the first container is below the specified level of computing resource utilization.

13. The method of claim 1, wherein the predetermined activity threshold specifies a level of network activity, and wherein monitoring the first container comprises monitoring whether a number of open network connections of the first container or an amount of network traffic of the first container is below the specified level of network activity.

14. The method of claim 1, wherein the predetermined activity threshold specifies a number of tasks, and wherein monitoring the first container comprises monitoring whether a number of tasks pending or in progress for the first container is below the specified number of tasks.

15. The method of claim 1, wherein disposing of the at least one task comprises cancelling the at least one task at the first container without initiating the at least one task at the second container; and
   wherein the method includes notifying a system that requested the at least one task that the at least one task is cancelled.

16. The method of claim 1, wherein disposing of the at least one task comprises transferring partial results of the at least one task from the first container to the second container such that the second container performs additional processing for the at least one task and combines results of the additional processing with the partial results from the first container.

17. The method of claim 1, wherein disposing of the at least one task comprises issuing to the second container a request for the second container to initiate processing of the at least one task.

18. A system comprising:
   one or more computers; and
   one or more computer-readable media storing instructions that, when executed, cause the one or more computers to perform operations comprising:
      providing a server environment using a plurality of containers that provide instances of different software modules, the plurality of containers including a first container running a first software image of a particular software module;
      determining that an updated software image is available for the particular software module;
      in response to the determining that the updated software image is available, starting execution of a second container that provides an instance of the updated software image;
      after starting execution of the second container, directing incoming requests to the second container while continuing to process, using the first container, a set of tasks that were initiated based on requests received before starting execution of the second container;
      executing the first container and the second container concurrently for a period of time while a level of activity of the first container is above a predetermined activity threshold for stopping execution of the first container, wherein the predetermined activity threshold is set at a level of activity that the first container can reach while the first container is actively processing one or more tasks in the set of tasks;
      while the first container and second container are executing concurrently and while the first container processes one or more tasks in the set of tasks:
         monitoring the first container to determine whether the level of activity of the first container while processing the one or more tasks is below the predetermined activity threshold; and
         determining, based on the monitoring, that the level of activity of the first container while processing the one or more tasks is below the predetermined activity threshold; and
      in response to determining that the level of activity of the first container is below the predetermined activity threshold and before the first container completes all of the tasks in the set of tasks:
         (i) disposing of at least one task in progress at the first container by at least one of:
            cancelling the at least one task at the first container without initiating the at least one task at the second container,
            transferring the at least one task and partial results of the at least one task from the first container to the second container such that the second container performs additional processing for the at least one task and combines results of the additional processing with the partial results from the first container, or
            issuing to the second container a request for the second container to initiate processing of the at least one task, and
         (ii) stopping execution of the first container without completing the at least one task with the first container.

19. The system of claim 18, wherein the server environment is configured to provide an analytics service to a plurality of client devices and over a computer network using interactions of the plurality of modules running in the respective containers.

20. One or more non-transitory computer-readable media storing instructions that, when executed by one or more computers, cause the one or more computers to perform operations comprising:
   providing a server environment using a plurality of containers that provide instances of different software modules, the plurality of containers including a first container running a first software image of a particular software module;
   determining that an updated software image is available for the particular software module;
   in response to the determining that the updated software image is available, starting execution of a second container that provides an instance of the updated software image;
   after starting execution of the second container, directing incoming requests to the second container while continuing to process, using the first container, a set of tasks that were initiated based on requests received before starting execution of the second container;
   executing the first container and the second container concurrently for a period of time while a level of activity of the first container is above a predetermined activity threshold for stopping execution of the first container, wherein the predetermined activity threshold is set at a level of activity that the first container can reach while the first container is actively processing one or more tasks in the set of tasks;
   while the first container and second container are executing concurrently and while the first container processes one or more tasks in the set of tasks:
      monitoring the first container to determine whether the level of activity of the first container while processing the one or more tasks is below the predetermined activity threshold; and determining, based on the monitoring, that the level of activity of the first container while processing the one or more tasks is below the predetermined activity threshold; and in response to determining that the level of activity of the first container is below the predetermined activity threshold and before the first container completes all of the tasks in the set of tasks:

(i) disposing of at least one task in progress at the first container by at least one of:

cancelling the at least one task at the first container without initiating the at least one task at the second container, transferring the at least one task and partial results of the at least one task from the first container to the second container such that the second container performs additional processing for the at least one task and combines results of the additional processing with the partial results from the first container, or issuing to the second container a request for the second container to initiate processing of the at least one task, and (ii) stopping execution of the first container without completing the at least one task with the first container.

* * * * *